United States Patent Office 3,651,025
Patented Mar. 21, 1972

3,651,025
DIENE POLYMERIZATION PROCESS
Arthur R. Bean, Jr., Buena Park, Mary J. Papavasiliou, Gardena, and John L. Snyder, Long Beach, Calif., assignors to Shell Oil Company, New York, N.Y.
No Drawing. Filed Feb. 2, 1970, Ser. No. 8,006
Int. Cl. C08d 5/02; C08f 27/00
U.S. Cl. 260—78.4 D
4 Claims

ABSTRACT OF THE DISCLOSURE

Conjugated diene polymers having improved processability, better dryability, green strength, and resistance to cold flow are prepared by polymerization of a conjugated diene coupling of the product with a multi-functional coupling agent and reinitiation of the polymerization to form a mixture of polymeric species.

This invention is concerned with the production of an improved conjugated diene polymer. More particularly it is directed to a process for the production of such polymers.

While a number of initiators and catalysts have been employed for their preparation, the most satisfactory type is a lithium based initiator, particularly lithium alkyls. In the general process, a lithium alkyl is utilized for the polymerization of a conjugated diene in an inert liquid such as a hydrocarbon and under anaerobic conditions. This produces a polymer of predetermined average molecular weight, dependent upon the ratio of the initiator to the monomer present. Since the polymer chains are propagated by and associated on a growing end with a carbanion and ion combination, the theory states that each polymer chain is associated with one lithium ion. Thus, the lower the ratio of lithium to monomer on the average the higher the molecular weight of the product if steps are not taken to avoid this end result. The cis, 1,4-content of the conjugated diene polymer has an overbearing influence on the physical properties of the polymer so derived. It has been found that the lower the ratio of initiator to monomer, the higher the cis 1,4-content will be but also the higher the molecular weight and therefore the higher the viscosity of the product will be. Since the product viscosity has a powerful effect on the processability and capability of the polymer to incorporate other compound ingredients, it is preferred that the molecular weight be kept reasonably low while still preparing product having a suitably high cis 1,4-content.

The physical properties of conjugated diene polymers and copolymers may be altered by another process step generally referred to as "coupling." By this is meant the joining of two or more "active" polymer chains to form either a linear polymer if two active polymer chains are coupled, or a branched polymer when more than two active polymer chains are coupled with a single coupling agent. The most desirable set of physical properties is usually observed with polymers which are of the branched variety. This requires the use of a polyfunctional coupling agent which will be more fully described hereinafter.

It is an object of the present invention to provide an improved process for the preparation of conjugated diene polymers. It is further object of the invention to provide conjugated diene polymers. It is a particular object of the invention to provide a process whereby the branched structure of polymers is obtained but the intrinsic viscosity thereof is controlled within a moderate range. Other objects will become apparent during the following detailed description of the invention.

Now, in accordance with the present invention, an improved process for the polymerization of conjugated dienes is provided which comprises the steps of polymerizing a conjugated diene at a temperature of about 20–90° C. with a lithium based initiator in an inert hydrocarbon medium until about 7.5–50% of the diene has been polymerized; coupling the living polymer so formed with at least a stoichiometric amount of a coupling agent which effects the coupling of at least three living polymer chains; thereafter adding a further amount of a lithium based initiator; continuing polymerization; and coupling the living polymer so formed with a coupling agent as defined in the previous coupling step.

More particularly, the process is especially beneficial when the coupling agent comprises a diester prepared by reaction of a dicarboxylic acid with an alcohol, preferably a monohydric alcohol. Still more beneficial results are obtained when using this particular type of coupling agent when the incremental additions of lithium based initiator are progressively increased following each coupling reaction. The cycles of coupling and reinitiation may vary from 2 to about 20, preferably 3–10. The present process provides the opportunity for preparing a product of either a narrow molecular weight range or if desired, and usually it is desirable, a product of comparatively broad molecular weight range.

The broadness of the molecular weight distribution of the product after a series of reinitiation cycles (or of a termination-reinitiation product) is a function of both the number of chains and the amount of product produced (the conversion) in each cycle. A narrow distribution will result if these two factors are such that the molecular weight is the same for the product from each cycle. Broader distributions, of course, result from differences in molecular weight between cycles. The number of chains can be varied by changing the initiator additions. The number of chains might also vary if one does not add coupling agent equivalent to the initiator. The amount of product is very closely related to the number of chains. If the worker knows the number of chains in the reactor, he can predict the reaction rate. Using the rate data, he can choose the amount of product produced by choosing the reaction time.

This process has four main variations:

(1) Like initiator and like conversion in the various steps to produce a narrow distribution product.

(2) Like initiator and varied conversion in the various steps to produce a broader distribution product with unequal amounts of the various types of chains.

(3) Varied initiator and like conversion in the various steps to produce a broader distribution product with equal amounts of the various types of chains.

(4) Varied initiator and varied conversion to produce any distribution from narrow to very broad.

The cis content of polymer produced during any given cycle depends on the initiator to monomer ratio.

The conjugated dienes which may be utilized comprise particularly butadiene and isoprene although isoprene is preferred.

The coupling agents which may be employed are capable of coupling at least three living polymer chains, thus promoting the formation of the desired branched configuration in the resulting coupled polymers. The functionality of the coupling agent is not based upon the apparent reactive groups of the particular agent employed but on the contrary depends upon the way in which coupling is effected with any particular type of coupling agent. This is especially striking in the case of the diesters referred to above since it has been found that coupling by the use of such diesters results in a mixture of coupled species having a molecular weight of from three to four times that of the living polymer being coupled. By "living polymer" is meant the polymeric carbanion associated at its growing end with a lithium ion. A stoichiometric amount of the particular type of coupling agent being used is desired in the process of the invention during the coupling step. For example, one mole of diester coupling agent to four moles of polymeric lithium carbanions approximates the stoichiometric ratio. If any excess of coupling agent is, in fact, employed it should be of a relatively restricted amount in the order of no more than about 25% excess, since this excess must be scavenged or otherwise removed before the next stage of polymerization may take place.

Suitable esters which may be employed for this coupling purpose include the following:

Esters

| | |
|---|---|
| Dimethyl oxalate | Diethyl oxalate |
| Dipropyl malonate | Dibutyl glutarate |
| Dihexyl pimelate | Dimethyl adipate |
| Diethyl adipate | Dioctyl sebacate |
| Dimethyl phthalate | Diethyl terephthalate |

Of the above types of esters, diethyl adipate and dimethyl adipate are preferred. In addition to the preferred class of diesters for the coupling step in the above described process, other polyfunctional coupling agents may be employed such as polyesters, polyepoxides, polyisocyanates, polyimines, polyaldehydes, polyketones, polyanhydrides, polyhalides, and the like. Typical species of these include epoxidized liquid polybutadiene, naphthalene tetraisocyanate, naphthalene tricarboxyaldehyde, anthracene tetron, silicon tetrachloride, and their analogs and homologs. However, the invention is especially designed to take advantage of the characteristics observed with the use of the diesters as the preferred class of coupling agents.

The polymerization is carried out in an inert solvent, generally a hydrocarbon which may be either aliphatic, cycloaliphatic, or aromatic or naphthenic. Suitable solvents include isoamylenes, cyclohexane, and the like. Mixtures of such solvents may be employed.

The process of the present invention may be referred to as a "coupling-reinitiation process" and results in a polymer which is much more processable than that obtained when the process comprises only a single polymerization step followed by a single coupling step. Moreover, the branched configuration of the polymer has been found to impart substantially improved resistance to cold flow and better dryability as well as green strength to the product.

The basic process may be complicated, particularly when a diester coupling agent is employed, by some retarding effect upon rate of polymerization which may be due to the presence of the reaction products of the coupling agent with the lithium terminated living polymer. It is patricularly preferred to increase the amount of lithium initiator by 5-20 weight percent in any given reinitiation stage following a coupling step.

The amount of lithium based initiator which may be utilized will depend upon the average molecular weight desired in the final product and upon the level of the cis 1,4 content of the product desired. Normally this will lie in the range of about 2-10 parts per mililon of lithium in the form of lithium alkyl initiator and preferably will be in the range of 3-8 parts per million. These amounts of initiator are based upon the total weight of the reaction mixture, namely, the monomer plus the solvent. The conjugated diene monomer is normally present in an amount between about 5 and 50% by weight based on the total reaction mixture. Furthermore, it is preferred in order to increase the cis 1,4-content still further to adjust the conditions of the polymerization so that polymerization is terminated with a substantial amount of conjugated diene monomer still in the reaction mixture. By substantial amount is meant an amount in the order of 20–60% of the monomer originally present.

The products obtained by the use of the present process exhibit substantially improved green strength and dryability properties as well as an improved processability, meaning the power needed to compound the polymer as well as the ease with which the polymer may be incorporated together with other ingredients of the compound such as fillers, vulcanizing agents, oil, and the like. The product obtained by the process has been demonstrated to be superior to linear polymer obtained by either simple termination of uncoupled polymer or by the use of a bifunctional coupling agent. It is furthermore superior to a linear polymer obtained by a series of polymerizations in which simple termination of the polymer was followed by reinitiation without using a multifunctional coupling agent in the process.

The following examples illustrate the process of the present invention and demonstrate the superior physical properties of the polymer so obtained.

EXAMPLE I

A polyisoprene was prepared utilizing isopentanes as the inert hydrocarbon medium and a secondary butyl lithium initiator in the amount of 4 parts per million based on the total reaction mixture. The isopentane reaction mixture contains 16 weight percent of isoprene. During the polymerization stages, the polymerization was carried out under isothermal conditions in a temperature range of between about 43 and about 47° C. A total reaction time of about 5½ hours was utilized. In the process, after the initial conversion of about 14% by weight of the original monomer to polyisoprene stoichiometric amount of dimethyl adipate was added to react with all of the carbanions present. Subsequently, a similar amount of butyl lithium was added as in the first polymerization step plus 20% to scavenge excess adipate and the polymerization and coupling steps were alternated until a total of eight of each steps had been effected.

| | |
|---|---|
| Cis 1,4 content, % | 85 |
| Dietert drying rate, $R_c \frac{lb.}{hr. ft^2}$ at 180° F | 1.9 |
| Intrinsic viscosity, dl/g. | 3.1 |
| $\frac{\text{Weight average mol. weight}}{\text{Number average mol. weight}}$ calculated from GPC | 1.8 |

EXAMPLE II

The object of this example was to produce a polyisoprene having a broad molecular weight distribution and a relatively lower cis content. It was prepared utilizing isoamylenes as the solvent and secondary butyl lithium initiator. Four parts per million of the initiator was used in the first cycle, polymerization being conducted at temperatures between 39–44° C. Dimethyl adipate was employed as the coupling agent, assuming the stoichiometric relationship of adipate to lithium to be 1:4, the ratio employed in all of the coupling cycles. Thereafter, for seven alternative stages of polymerization and coupling in the second cycle coupling stage, 130% of the stoichiometric amount of initiator was employed and in following, cycles increases of 5 percentage points per cycle to the final cycle of 160%. The original concentration of isoprene in isoamylenes was 19 weight percent. Final conversion was 96 weight percent with a total reaction time of about 5 hours. The product had an intrinsic viscosity of 3.7 dl./g. and contained 80% cis 1,4. It had a drying rate as referred to in the preceding example of greater than 2, while the ratio of weight average molecular weight to number average molecular weight was 1.7.

EXAMPLE III

A product was prepared by a process not coming within the scope of the present invention, the objective being to produce a narrow molecular weight distribution product having a high cis 1,4-content. Isoprene was polymerized in isopentane solution at temperatures between 43–47° C. using 6 parts per million of secondary butyl lithium catalyst. The feed contained 16% by weight of isoprene. After 19% conversion, the product was coupled with dimethyl adipate using 120% of a 1:4 adipate to lithium molar ratio. The polymerization reaction time was 15 minutes. This resulted in a coupled polymer having an intrinsic viscosity of 3.2 dl./g. and a cis content of 86%. The dietert drying rate was 1.0 lbs./hr. ft.$^2$ at 180° F.

EXAMPLE IV

A second product was prepared by a process which did not fall within the scope of the presently claimed invention, the objective being to prepare a polymer having a narrow molecular weight distribution and a relatively low cis 1,4-content. Isoprene was polymerized in isopentane solution at temperatures bewteen 48–55° C. using 25 parts per million of initiator, namely, secondary butyl lithium. The feed contained 12% by weight of isoprene. After 83% conversion, the product was coupled with diethyl adipate using 120% of a 1:4 adipate:lithium ratio. Reaction time as 2.75 hours and resulted in a coupled polyisoprene having an intrinsic viscosity of 3.6 dl./g. It had a cis 1,4-content of 73% and a dietert drying rate of 1.7 lbs./hr. ft.$^2$ at 180° F. For comparison, the polymers obtained in the previous four examples were compounded into the following tread stock recipe:

| Ingredient: | Parts by weight |
|---|---|
| Polymer | 100 |
| Zinc oxide | 3 |
| Stearic acid | 3 |
| Phenyl-beta-naphthylamine | 1 |
| HAF black | 50 |
| Aromatic extending oil | 5 |
| Sulfur | 2 |
| N-cyclohexyl-2-benzothiazole sulfenamide | 0.6 |
| | 164.6 |

Comparative properties are shown in Table I for all four polymers and Table II compares the polymers obtained from Example I (according to the present invention) and Example IV (not according to the present invention).

TABLE I

| Polymer from Example | I | II | III | IV |
|---|---|---|---|---|
| Intrinsic viscosity, dl./g | 3.1 | 3.7 | 3.2 | 3.6 |
| Cis 1,4 content, percent | 85 | 80 | 86 | 73 |
| Mw/Mn distribution | 1.8 | 1.7 | | |
| Raw Mooney, ML–4 | 49 | 61 | 55 | 77 |

TABLE II

| Polymer from Example | I | IV |
|---|---|---|
| Intrinsic viscosity, dl./g | 3.1 | 3.6 |
| Raw Mooney, ML–4, ML–4' | 42 | 77 |
| Banbury dump, quality | Good+ | Good |
| Dump temperature, °F | 231 | 250 |
| Dump power, kw | 4.0 | 4.4 |
| 10'' mill sheet, quality | Good | Good |
| Compound Mooney, ML–4, ML–4' | 58 | 83 |
| Garvey: | | |
|   Rating, 1–16 | 14 | 11 |
|   Swell, percent | 50 | 54 |
| Extrusion rate: | | |
|   G./min | 135 | 132 |
|   In./min | 36 | 33 |
| Green: | | |
|   Tensile, yield, p.s.i | 26 | 37 |
|   Tensile, break, p.s.i | 12 | 22 |
|   Elongation, break, p.s.i | 285 | 220 |
|   Break energy, j./cc | 0.39 | 0.45 |
|   Yield elongation, percent | 66 | 66 |
|   Yield energy, j./cc | 0.13 | 0.12 |

TABLE II—Continued

| Polymer from Example | I | IV |
|---|---|---|
| Cured: | | |
|   Tensile, p.s.i | 3,150 | 2,950 |
|   300% modulus, p.s.i | 1,300 | 1,250 |
|   500% modulus, p.s.i | 2,500 | 2,400 |
|   Elongation to break, percent | 620 | 570 |
|   Hardness, Shore A | 59 | 59 |
|   Angle tear, p.l.i | 375 | 365 |
|   Hot tensile, 250° F., p.s.i | 1,670 | 1,220 |
|   Hot tear, 250° F., p.l.i | 300 | 175 |

EXAMPLE V

A preferred product is made by polymerizing isoprene in isopentane solvent, using about 50 weight percent of isoprene in the feed and carrying out eight alternative cycles of polymerization and coupling to about 30% final conversion. Secondary butyl lithium is employed for polymerizing, utilizing two parts per million in the first cycle and increasing this progressively to 6 parts per million in the eighth cycle. Conversion is 3.7% for each cycle, the polymerization being carried out at temperatures between 43–47° C. The coupling is carried out with diethyl adipate and results in a product having 3.5 dl./g. intrinsic viscosity and a cis 1,4-content of about 91%.

We claim as our invention:

1. A process for the production of polyisoprene which comprises:
   (a) polymerizing isoprene at a temperature 20–80° C. with a lithium alkyl initiator in an inert hydrocarbon medium until 7.5–50% of the isoprene has been polymerized;
   (b) coupling the living polymer so formed with at least a stoichiometric amount of a coupling agent which is at least trifunctional;
   (c) thereafter adding a further amount of a lithium alkyl initiator;
   (d) continuing polymerization; and
   (e) coupling the living polymer so formed with a coupling agent as defined in step (b), the stages of polymerizing and coupling being repeated 2–20 times each.

2. A process according to claim 1 comprising the following steps:
   (a) polymerizing isoprene at a temperature of 20–80° C. with a lithium alkyl catalyst in an inert hydrocarbon medium until at least about 7.5% of the isoprene has been polymerized;
   (b) coupling the living polymer so formed with at least a stoichiometric amount of a diester of a dicarboxylic acid and a monohydric alcohol;
   (c) thereafter adding a further amount of a lithium alkyl initiator in an active lithium amount substantially greater than the initial active lithium concentration;
   (d) continuing polymerization; and
   (e) coupling the living polymer so formed with an ester as defined in step (b).

3. A process according to claim 1 wherein the amount of lithium initiator added in step (c) is 20–35% by weight greater than the amount added in step (a).

4. A process according to claim 1 wherein step (c), (d), and (e) are repeated, each succeeding step (c) using 5–20% by weight lithium initiator greater than in the last preceding step (c).

References Cited
UNITED STATES PATENTS

| | | | |
|---|---|---|---|
| 3,135,716 | 6/1964 | Uraneck et al. | 260—41.5 |
| 3,465,063 | 9/1969 | Hassell et al. | 260—876 |
| 3,551,392 | 12/1970 | Snyder et al. | 260—78.4 |

JOSEPH L. SCHOFER, Primary Examiner

J. KIGHT III, Assistant Examiner

260—94.2 M, 94.7 R, 96 R